US007145299B2

(12) United States Patent
Noro et al.

(10) Patent No.: US 7,145,299 B2
(45) Date of Patent: Dec. 5, 2006

(54) POWER WINDOW CONTROL SYSTEM

(75) Inventors: Yoshiki Noro, Wako (JP); Toru Namiki, Wako (JP); Kenji Shioiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 10/935,436

(22) Filed: Sep. 7, 2004

(65) Prior Publication Data

US 2005/0052082 A1 Mar. 10, 2005

(30) Foreign Application Priority Data

Sep. 8, 2003 (JP) ............................ 2003-315940

(51) Int. Cl.
*H02P 5/00* (2006.01)
*H02G 3/00* (2006.01)

(52) U.S. Cl. ......................... 318/49; 318/53; 318/449; 318/292; 318/293; 307/10.1

(58) Field of Classification Search .................. 318/49
See application file for complete search history.

(56) References Cited

U.S. PATENT DOCUMENTS

| | | | | | |
|---|---|---|---|---|---|
| 3,229,181 | A | * | 1/1966 | Evans | 318/293 |
| 4,288,726 | A | * | 9/1981 | Vazquez-Cuervo et al. | 318/54 |
| 4,361,788 | A | * | 11/1982 | Melocik | 318/83 |
| 4,476,416 | A | * | 10/1984 | Licata et al. | 318/283 |
| 4,612,495 | A | * | 9/1986 | Yamauchi et al. | 322/100 |
| 4,677,315 | A | * | 6/1987 | Blauschild et al. | 327/73 |
| 4,677,356 | A | * | 6/1987 | Tsuneda et al. | 318/258 |
| 4,896,084 | A | * | 1/1990 | Maue et al. | 318/280 |
| 5,099,091 | A | * | 3/1992 | Kokubu | 200/5 B |
| 5,121,038 | A | * | 6/1992 | Yamamura et al. | 318/280 |
| 5,121,386 | A | * | 6/1992 | Wolfsgruber et al. | 370/462 |
| 5,245,217 | A | * | 9/1993 | Honma | 307/10.1 |
| 5,296,788 | A | * | 3/1994 | Betton et al. | 318/283 |
| 5,305,316 | A | * | 4/1994 | Yoshida et al. | 370/357 |
| 5,329,163 | A | * | 7/1994 | Satoh et al. | 307/10.1 |
| 5,334,876 | A | * | 8/1994 | Washeleski et al. | 307/10.1 |
| 5,349,694 | A | * | 9/1994 | Kawano et al. | 455/11.1 |
| 5,367,250 | A | * | 11/1994 | Whisenand | 324/133 |
| 5,369,343 | A | * | 11/1994 | Niemela | 318/280 |
| 5,510,684 | A | * | 4/1996 | Moroi et al. | 318/282 |
| 5,519,256 | A | * | 5/1996 | Goodridge | 307/10.8 |
| 5,572,098 | A | * | 11/1996 | Dreon et al. | 318/293 |
| 5,590,013 | A | * | 12/1996 | Harasawa | 361/187 |
| 5,714,852 | A | * | 2/1998 | Enderich | 318/256 |
| 5,731,675 | A | * | 3/1998 | McCarthy | 318/469 |
| 5,949,207 | A | * | 9/1999 | Luebke et al. | 318/446 |
| 6,002,224 | A | * | 12/1999 | Stern | 318/280 |
| 6,072,290 | A | * | 6/2000 | Takagi et al. | 318/283 |

(Continued)

FOREIGN PATENT DOCUMENTS

EP 0 869 040 A2 10/1998

(Continued)

*Primary Examiner*—Lincoln Donovan
*Assistant Examiner*—Robert W. Horn
(74) *Attorney, Agent, or Firm*—Rankin, Hill, Porter & Clark LLP

(57) ABSTRACT

A master controller installed in a master controller box and slave controllers installed in car doors to open and close window glasses of a car are connected by a single wire to each of slave controllers for enabling to send control signals through such a single wire so that the master controller applies DOWN current signal, UP current signal and no flow of current to slave controllers.

10 Claims, 5 Drawing Sheets

U.S. PATENT DOCUMENTS

| | | | | |
|---|---|---|---|---|
| 6,081,085 | A * | 6/2000 | Ohashi et al. | 318/283 |
| 6,111,326 | A * | 8/2000 | Miyata et al. | 307/10.1 |
| 6,201,363 | B1 * | 3/2001 | Miyazawa | 318/283 |
| 6,388,221 | B1 * | 5/2002 | Rudolph et al. | 200/556 |
| 6,404,155 | B1 * | 6/2002 | Funayama et al. | 318/293 |
| 6,459,060 | B1 * | 10/2002 | Bartok | 200/553 |
| 6,515,377 | B1 * | 2/2003 | Ubelein et al. | 307/10.1 |
| 6,563,279 | B1 * | 5/2003 | Sugawara | 318/443 |
| 6,600,122 | B1 * | 7/2003 | Czarnecki et al. | 200/553 |
| 6,690,131 | B1 * | 2/2004 | Shimomura et al. | 318/445 |
| 6,759,817 | B1 * | 7/2004 | Mersch | 318/34 |
| 6,931,125 | B1 * | 8/2005 | Smallwood | 379/433.07 |
| 6,965,207 | B1 * | 11/2005 | Terakawa et al. | 318/445 |
| 6,974,918 | B1 * | 12/2005 | Blossfeld | 200/5 R |
| 2005/0052082 | A1 * | 3/2005 | Noro et al. | 307/10.1 |

FOREIGN PATENT DOCUMENTS

| | | |
|---|---|---|
| JP | 01-152980 | 6/1989 |
| JP | 11-182132 | 7/1999 |
| JP | 2000-087644 | 3/2000 |

* cited by examiner

Part of PW

POWER WINDOW CONTROL SYSTEM

FIELD OF THE INVENTION

The present invention relates to a power window control system that controls power window regulators (called regulators hereinafter) driven by electric motors to open and close the automobile window glasses.

BACKGROUND OF THE INVENTION

Power window systems are the systems to push up and pull down automobile windows by means of regulators driven by electric motors and widely used for high-class sedans and other four-wheel cars. The controllers (power window switching devices) are to push up and pull down the windows installed in the doors close to the passenger seats. Total window control systems include a master controller which is installed at the doors by driver seats. The regulators are controlled by both the master controller and the slave controllers which are installed in the doors by the passenger seats. The master controller has a function to stop the control of slave controllers that control the regulators installed in the doors by the passenger seats.

FIG. 4 shows a block diagram of a power window system adopted by the conventional four-door cars.

The master controller 31 placed at the driver seat adopted to the conventional power window system 50 operates to push up and pull down windows at the doors by the passenger seats as well as windows 44, 45 and 46 at the door by the driver seat.

The master controller 31 placed at the driver seat supplies UP current and DOWN current to the slave controller 30 installed in the door by the driver assistant seat (called an assistant controller 32 or simply a slave controller, hereinafter), the slave controller 30 installed in the right rear door by the passenger seat (called a right rear passenger controller 33 or simply a slave controller, hereinafter) and the controller installed in the left rear door by the passenger seat (called a left rear passenger controller 34 or simply a slave controller, hereinafter) motors by which the, electric power is supplied to the corresponding motors connected to these controllers and the corresponding regulators are driven thereby. The current supplied to the slave controllers 30 is allocated as DOWN current in the wire S1 and UP current in the wire S2 in such a way that DOWN current is to pull down the window glasses 44, 45 and 46 to open the windows and is to push up the window glasses to close the windows, respectively (as referred to Reference 1).

FIG. 5 shows a concrete circuit diagram of the conventional power window system where the electrical linkage between the master controller 31 and the slave controller 30 is shown.

As shown in FIG. 5, the current supply is selectively switched on to UP current and DOWN current both supplied to the slave controllers 30 for closing or opening the other windows 44, 45 and 46 than driver seat window. In other words, by pushing the UP switch 31*a* of the master controller 31 "ON" the current flowing from the battery (not shown in the figure) through the terminal F goes through the coil R31 of the rely R3 installed in each slave controller 30 to the ground set in the master controller 31 as UP current. This current sets the relay R31 "on" and then the current indicated by the arrow c is supplied to the motor M which rotates the motor M in the normal revolution. By this motor rotation, the window glasses (44, 45 and 46) are pushed up to close the windows. By pushing the DOWN switch 31*b* of the master controller 31 "ON" the current flows from the battery (not shown in the figure) through the terminal G goes through the coil R41 of the rely R4 installed in each slave controller 30 to the ground set in the master controller 31 as UP current. This current sets the relay R41 "on" and then the current shown in the arrow d is supplied to the motor M which rotates in the reverse revolution. By this motor rotation, the window glasses (44,45 and 46) are pulled down to open the windows. In this operation, two wires S1 and S2 to which the master controller 31 selectively makes the current pass by the switches 31*a* and 31*b* are used to operate the relays R31 and R41 to control the motors M for the window operation. All of slave controllers 30 have UP switches 30*a* and DOWN switches 30*b* and they allow the operation of the window glasses (44, 45 and 46) to be pushed up and pulled down.

(Reference 1)

Paragraphs 0006 to 0008 and the FIG. 1, Japanese Published Patent, 2000-87644, A (2000)

BRIEF SUMMARY OF THE INVENTION

In the conventional power window system, two power current wires S1 and S2 are required to supply the UP current and the DOWN current. The problems of this cabling for current wires are that two power current wires dedicated for the UP current and the DOWN current are used, that two thick wires are used for each slave controller 30 and that power current control can easily damaged by the electrical contact failures at the switches installed in the master controller 31 so that the long term reliability is reduced as well. The installation of the harness to maintain good electrical contact is another source of trouble in reliable assembly of automobile manufacturing.

In order to solve, the present invention provides a widow control system where the master controller uses a single signal wire to control each slave controller and the signal is managed by electronic system so that the degradation of electrical contact does not cause significant failures. The present invention has further advantage in reliable master and slave operation to open and close the car windows, especially in long term reliability since the electronic system can avoid the surge current in the switch operation due to no coil inductance included so that less damage is generated at the contact point of the switches.

The present invention provides the power window control systems that have the features described above. The power window control system in the present invention comprises controllers for a master-slave control, single signal wires that support a dual signal operation and a null signal operation, selecting means of signal currents, slave-controllers including a control circuit and a relay circuitry both respectively to drive and not to drive the motors which force and do not force the regulator for the operations to open and close and to stop the car windows installed in the doors wherein the slave controllers are set.

The single signal wires that connect the master controller and the slave controllers allow the dual signal modes as "window close" and "window open" and the null signal as "window stop". The reduction of harness weight by using the single signal wires contribute to keeping the weight down and the cost down in a car.

The use of electronic circuits for the window control system can accept thinner wires for operation than the conventional system since the electronic circuit has a signal amplification capability.

The use of electronic circuits can isolate the control current wires from the relay coils and no surge current is generated to the control current wires. Therefore the electrical contact points at the switches installed in the master controller are not damaged, that improves the long-term reliability of total power window control system.

DETAILED DESCRIPTION OF THE INVENTION

Figure 1:
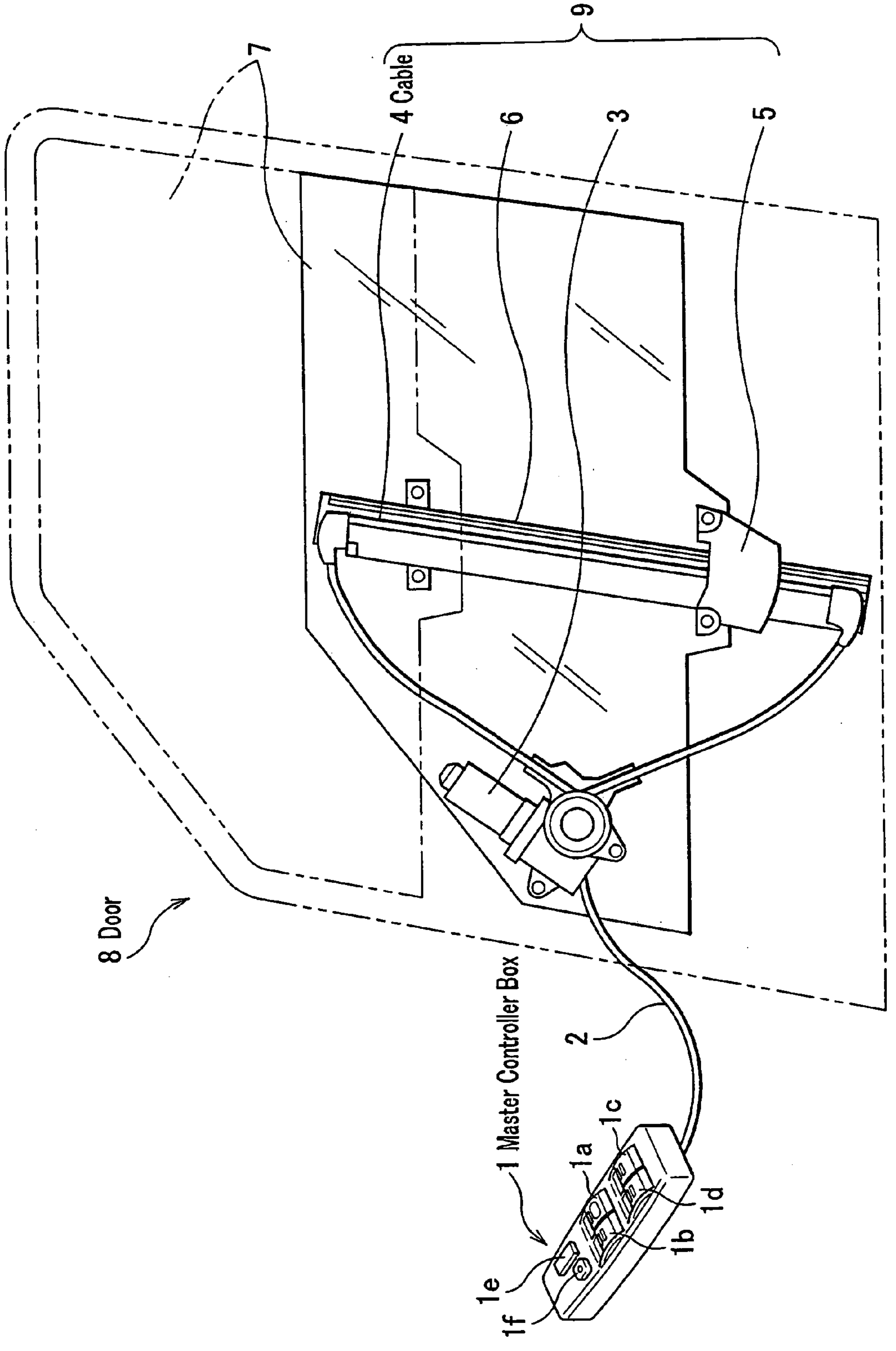
FIG. 1 is a schematic that shows the power window control system of the present invention.
Figure 2:
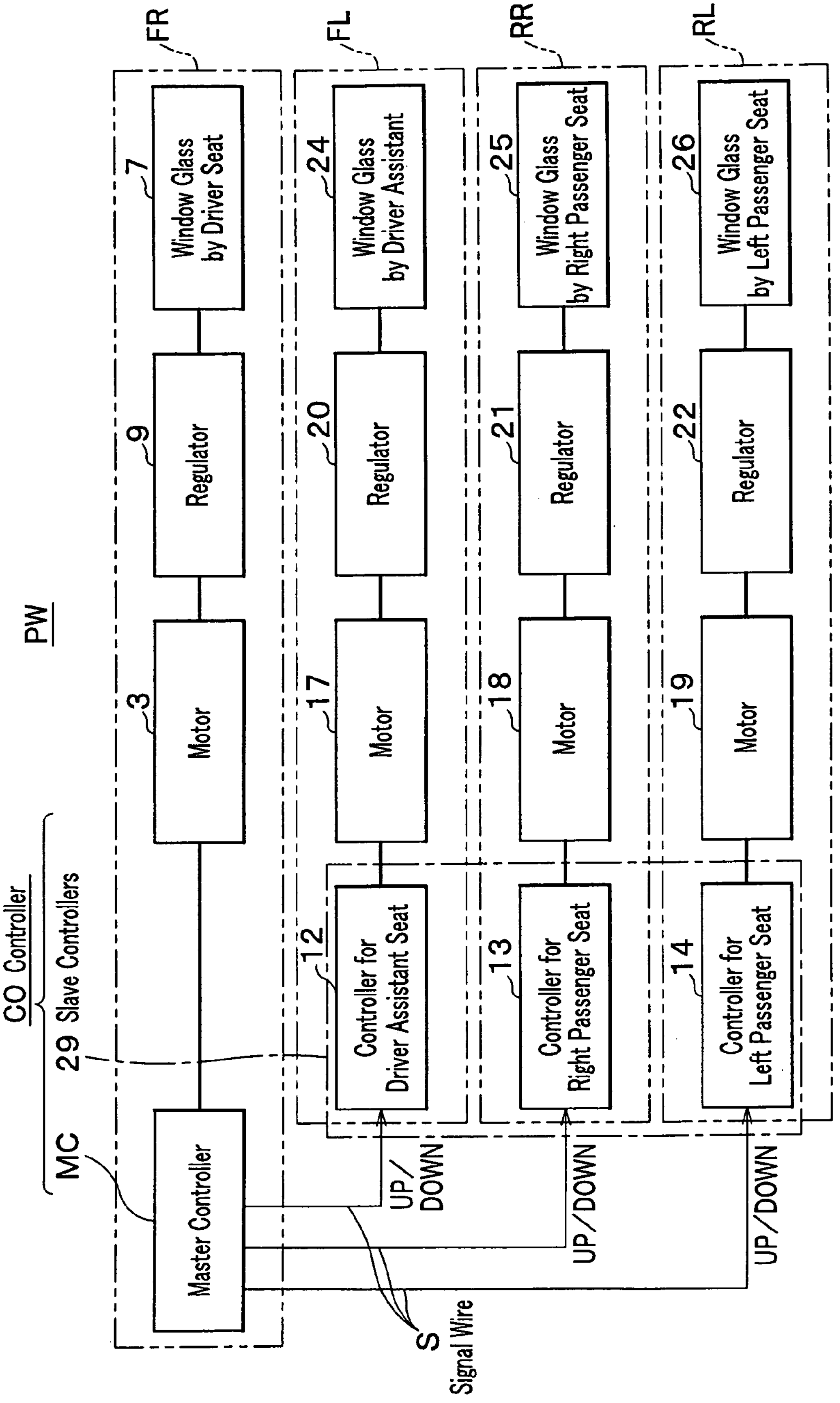
FIG. 2 is a block diagram that shows the power window control system of the embodiment in the present invention regarding the four-door car.

By referring to FIG. 1 to FIG. 3, the power window control system related to the present invention will be explained FIG. 1 shows an embodiment of the power window control system of the present invention showing a master controller box 1 including a master controller MC and a regulator 9. The regulator 9 is installed in the door 8 by the driver seat FR. FIG. 2 especially shows the window control system PW of the present invention installed in the four-door car.

The regulator 9 shown in FIG. 1 is a well-known one and will be explained briefly regarding the construction and the operation of the present invention in order to easily understand the power window system PW thereof.

The master controller box 1 is a switch box set in the arm rest (not shown in figures) formed in the front right door 8 by the driver seat FR for the purpose of the so-called power window control. The master controller box 1 has six switch knobs 1*a*, 1*b*, 1*c*, 1*d*, 1*e* and 1*f*. The knob 1*a* is attached to a selective switch that is to push up or pull down the door window 7 by the driver seat FR. The knob 1*b* is for the door window 24 by the driver assistant seat. The knobs 1*c* and 1*d* are for the door windows 25 and 26 by the right and left passenger seat, respectively. The knob 1*e* is attached to a seesaw switch to select/deselect the slave controllers that is to unlock/lock the windows. The knob 1*f* is attached to a push switch to lock/unlock all doors 8 (called door switch) The switches to which the knobs of 1*a* to 1*d* are attached are selective switches to push up and pull down the door windows.

The master controller box 1 includes two switching means; one is a selective switch for closing and opening the window by the driver seat and the other is a selective switch for closing an opening the windows by the seats other than driver seat. The knob 1*a* is attached to the former selective switch and the knobs 1*b*, 1*c* and 1*d* are attached to the latter selective switch. The master controller selective switch 11 in FIG. 3 shows one of the selective switches 1*b*, 1*c* and 1*d*. The master controller box 1 includes the master controller selective switch 11 as shown in FIG. 3 and these selective switch for which the knob 1*a* is used and the related relay system to control closing and opening the window by the driver seat FR. Other than these two selective switches, the master controller box 1 has two selective switches as described before; one for the seesaw switch (to which the knob 1*e* is attached) to select/deselect the slave controllers that is to unlock/lock the windows and the other as the push switch (to which the knob 1*f* is attached) to lock/unlock all doors 8.

Once a selective switch for power window systems other than the slave system is "on" in UP and "on" in DOWN, the UP current and DOWN current are supplied through the harness 2 to a relay control system to control the motor current. Then the motor 3 rotates in the normal rotation or the reverse rotation and then the carrier plate 5 slides upward or downward along the guide 6. The window glass 7 which is fixed to the carrier plate 5 goes up or down and the window by the driver seat FR is closed or opened. The motor 3, the wire 4, the carrier plate 5 and the guide 6 compose a regulator 9.

As shown in FIG. 2, the controllers of the power window control system are composed of the master controller MC installed in the master controller box 1 which is placed at the door 8 (FIG. 1) by the driver seat FR, the slave controllers 29 placed in the doors of other seats FL, RL and RR. The slave controllers 29 are controlled by the master controller MC. The slave controllers 12, 13 and 14 drive the regulators 20, 21 and 22 to push up and pull down the windows 24, 25, and 26 which are controlled by the slave controllers 29, respectively, in a manner of each at the each seat. The master controller box 1 has the seesaw switch to deselect the slave controllers.

As shown in FIG. 2, one window system supports closing and opening the door window by the driver seat. The switch action to the master controller MC accesses the controller CO to supply current to the motor 3 so that the window glass 7 by the driver seat is closed or opened by the regulator 9 installed in the front right door 8.

As shown in FIG. 2, the other window system supports closing and opening the door windows by the seats other than the driver seat. The switch action to the master controller box 1 sends UP or DOWN current signals to slave controllers 12, 13 and 14 through the signal wire S then the slave controllers 29 supply current to the motors 20, 21 and 22 so that the window glasses FL, RL and RR as the window glass FR by the driver assistant seat, the rear left seat and the rear right seat are closed or opened by the regulators 24, 25 and 26 installed in the front left door, the rear left door and the rear right door, respectively. When no action to the window glasses 24, 25 and 26 are requested, no current signals are sent to slave controllers 12, 13 and 14, respectively.

Figure 3:
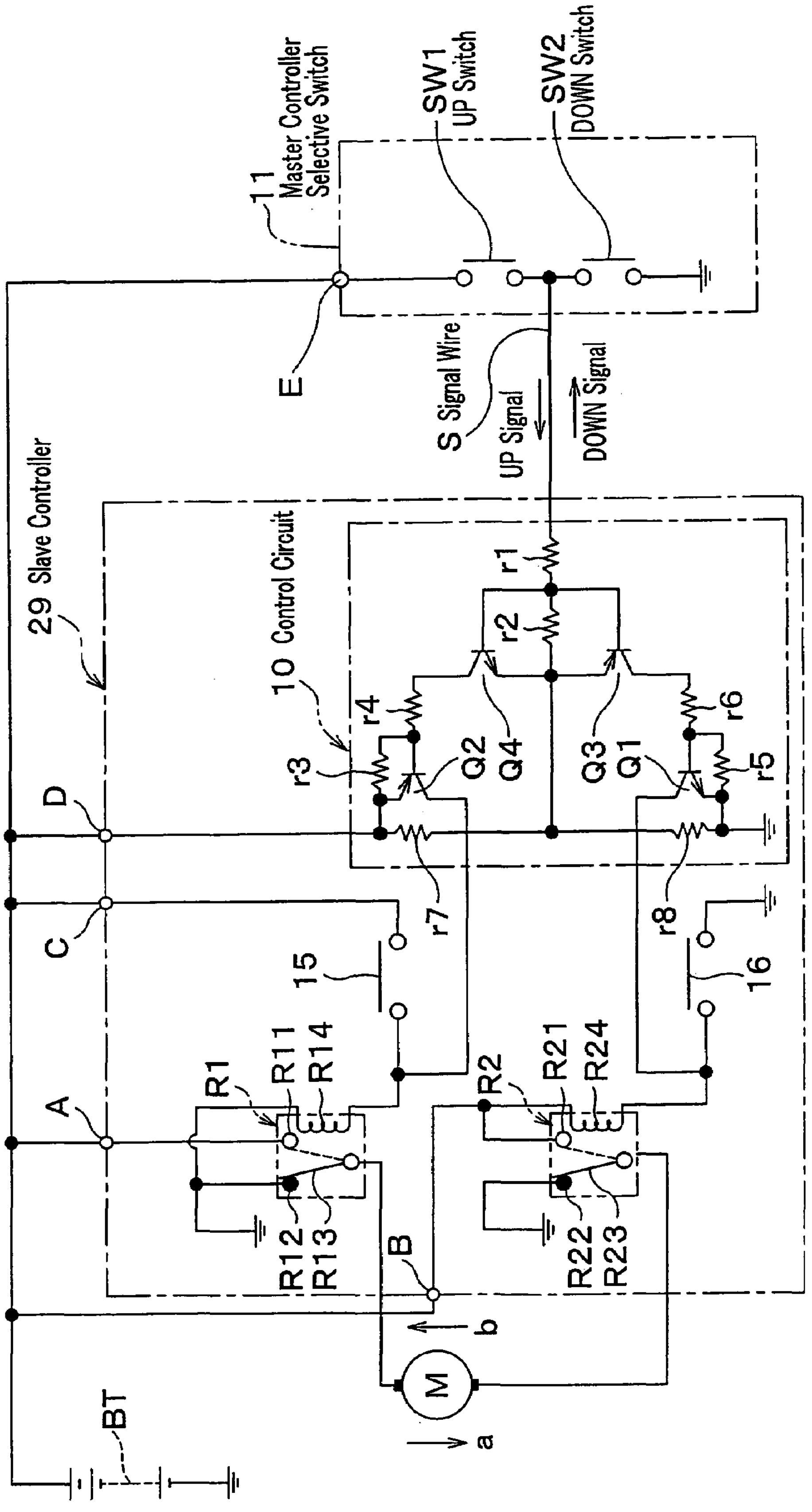
FIG. 3 is a circuit diagram that shows the switches in the master controller and one of the slave controller of the embodiment of the present invention.
Figure 4:
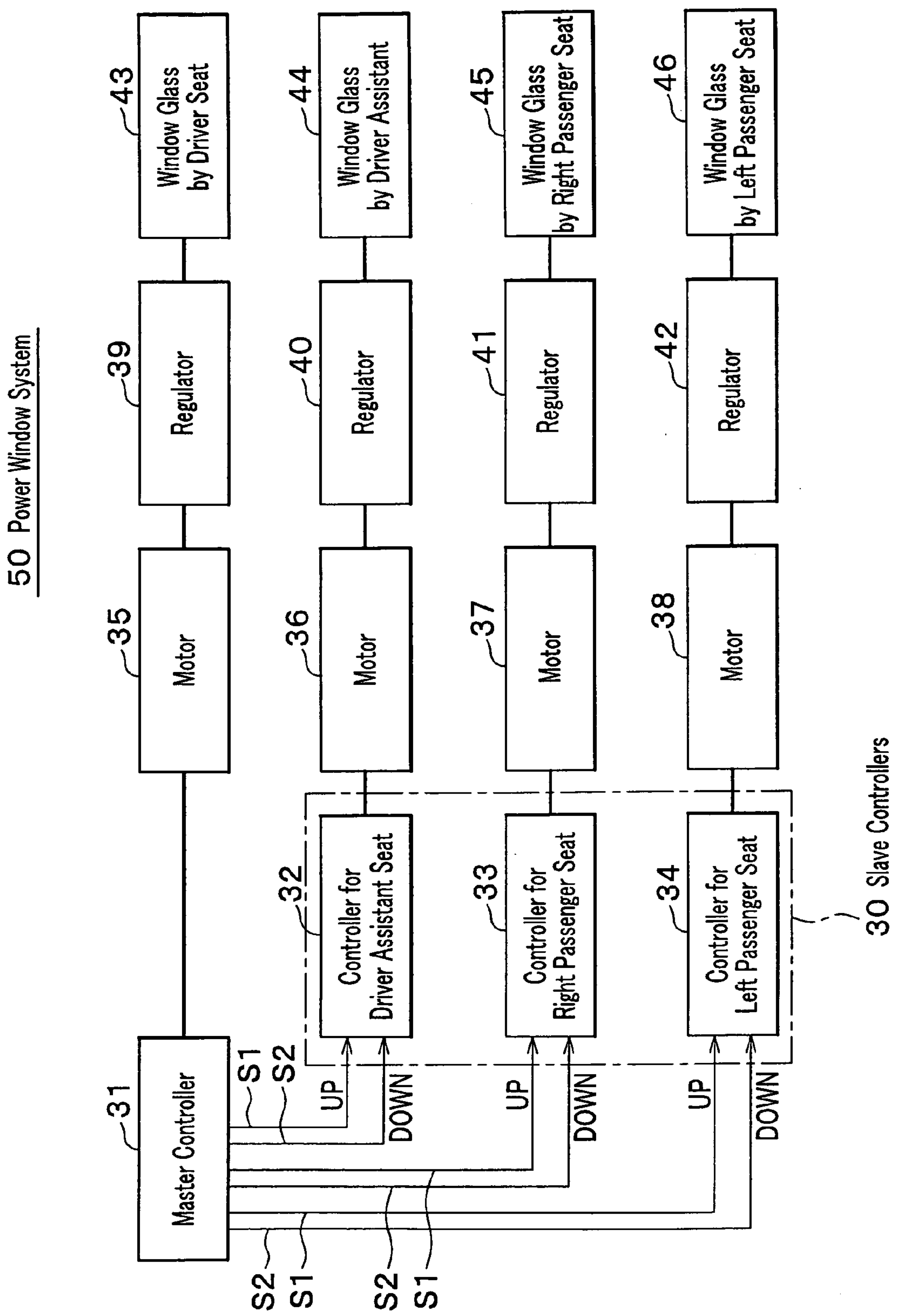
FIG. 4 is a block diagram that shows the power window control system of the conventional technology.
Figure 5:
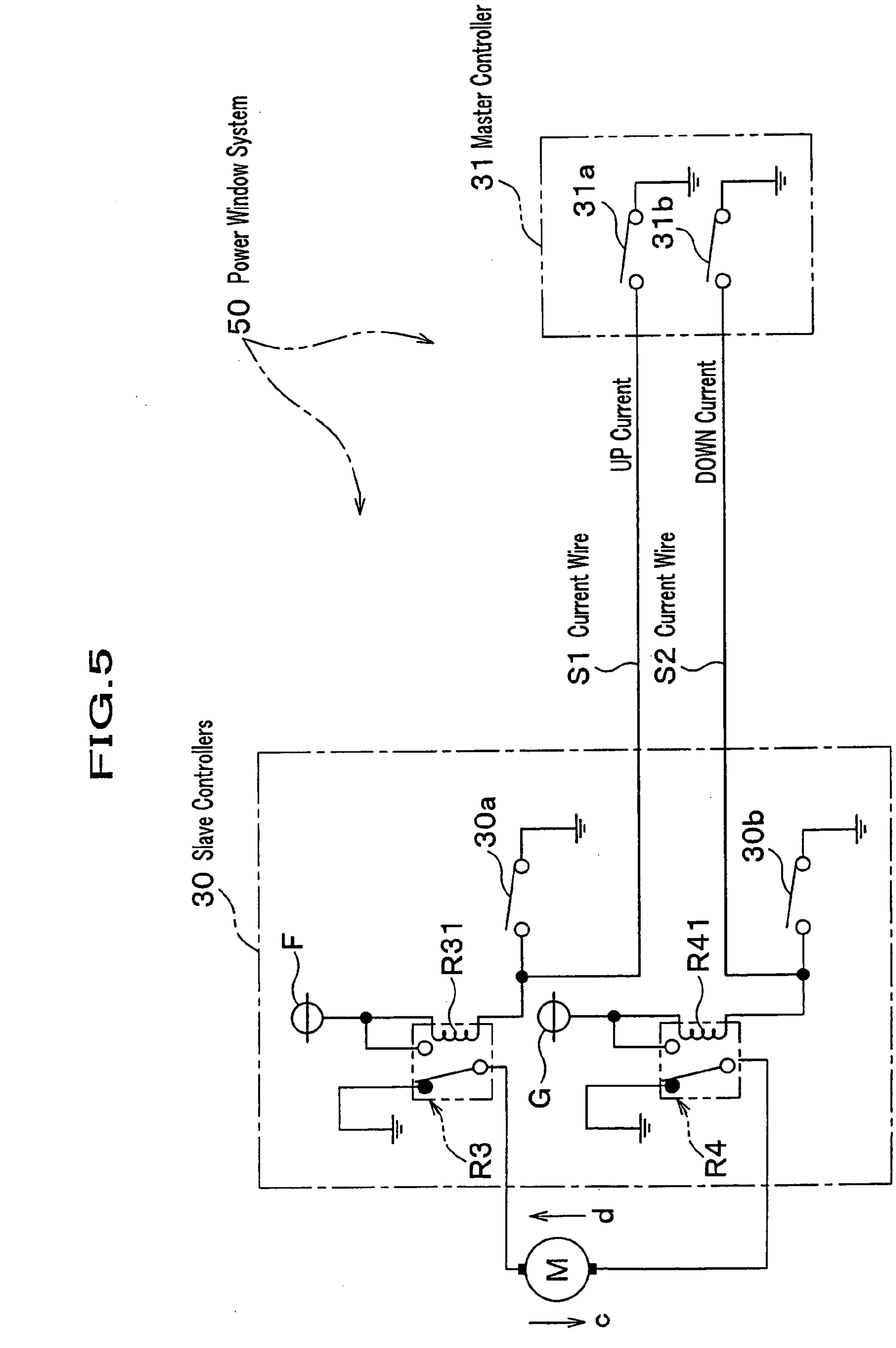
FIG. 5 is a circuit diagram that shows the control of a slave controller by a master controller used in the conventional technology.

As shown in FIG. 3, the master controller MC and each slave controller 29 are connected by a single signal wire S. The master controller MC has a selective switch which is constructed with two serially connected two single channel one port switches or is a single channel two ports switch. These selective switches are configured in such a usage that one port is assigned for UP switch SW1 and the other port for DOWN switch SW2. The signal wire S is connected to the mutually connected point of the serially connected two single channel one port switches or the central terminal of the single channel two ports switch. One of the ports of the master controller selective switch 11 is connected to the power terminal of the battery BT and the other port of the master controller selective switch 11 is to the ground line which is common to the other terminal of the battery BT.

The slave controller 29 comprises a control circuit 10 which works for signal processing of the input signal given by the master controller MC, an UP switch, and a DOWN switch, relay circuitry including a relay R1 and a relay R2.

The control circuit 10 is constructed with a Darlington circuit in a complementary configuration for which paired transistors as a PNP transistor Q3 and an NPN transistor Q4 and another paired transistors as a PNP transistor Q2 and an NPN transistor Q1 are used. A current limiting resistor r1 and a base bias current resistor r2 for Q2 and Q4 are used. The collector of Q4 is connected to the base and emitter of Q2 through the resistors r4 and r3 to drive Q2 of which emitter is connected to the power terminal of the battery BT at the power input port D. The collector of Q3 is connected to the base and emitter of Q1 through the resistors r6 and r5 to drive Q1 of which emitter is connected to the common ground of the battery BT. Two resistors r7 and r8 are connected in series between the power input port D and the common ground, which works as a current breeder to the basis bias of Q3 and Q4 and a neutral voltage point therebetween. The voltage of the battery BT varies about 10 to 16 voltages depending on the charge and discharge conditions as well as operation conditions.

The transistors Q1 to Q4 are bipolar semiconductor transistors in this embodiment, however they may be power MOS transistors in a voltage-driven operation.

The relay drive transistor Q2 is directly connected to the battery input port D at the emitter. The collector of Q2 is directly connected to the relay as a collector load wherein the relay is connected to the ground at the other port. An UP switch 15 is installed in the slave controller 29 in parallel to Q2 to connect to the battery input C. The window glass can be forced to be pushed up by using this UP switch 15. As similar circuit configuration to Q2, the other relay drive transistor Q1 is directly connected the ground at the emitter. The collector Q1 is directly connected to the relay as a collector load wherein the relay is connected to the battery input B. A DOWN switch 16 is installed in the slave controller 29 in parallel with Q1 to connect to the ground. The window glass can be forced to be pulled down by using this DOWN switch 16.

A terminal of the motor M is connected to the movable contactor R13 of the relay R1 and the other terminal of the motor M is connected to the movable contactor R23 of the relay R2.

The relay R1 has a normally-open fixed contactor R11 which is connected to the battery input A, a normally-close fixed contactor R12 connected to the ground, a movable contactor and a coil R14 which is grounded at a terminal and connected to the collector of Q2 and a terminal of the UP switch 15.

The relay R2 has a normally-open fixed contactor R21 which is connected to the battery input B, a normally-close fixed contactor R22 connected to the ground, a movable contactor and a coil R24 which is connected to the battery input B and connected to the collector of Q1 and a terminal of the DOWN switch 16.

The manipulation to close and open the window glasses by using the master controller selective switch 11 to manage the slave controller 29 will be explained.

When the UP switch SW1 of the master controller selective switch 11 installed in the master controller MC is set on as "ON", the current from the battery flows into the base of Q4 and the collector current of Q4 which gives the base current to Q2. The base current to Q2 drives the collector load which is the coil R14 of the relay R1. Then the coil R14 pulls the movable contactor R13 to the contactor R11. Since the relay R2 maintains normally-close to the ground, the current as shown in a direction indicated by an arrow "a" flows and drives the motor M. This current rotates the motor M in a normal direction which is to push up the window glass (one of 24, 25 and 26) to close.

Regardless to the operation of the transistor Q2, UP switch 15 installed in the slave controller 29 can actuate the current flow "a" by activating the coil R14. Then the window glass (one of 24, 25 and 26) is forced to close as well.

The other manipulation means to open the window glasses by using the master controller selective switch 11 to manage the slave controller 29 will be explained.

When the DOWN switch SW2 of the master controller selective switch 11 installed in the master controller MC is set to "ON", the current from the battery flows into the base of Q3 and the collector current of Q3 which gives the base current to Q1. The base current to Q1 drives the collector load which is the coil R24 of the relay R2. Then the coil R24 pulls the movable contactor R23 to the contactor R21. Since the relay R1 is normally closed to ground, the current as shown in a direction indicated by arrow "b" flows into the motor M and the motor M rotates. In other words, this current rotates the motor M in a reverse direction which is to push up the window glass (one of 24, 25 and 26) to open.

Regardless to the operation of the transistor Q1, DOWN switch 16 installed in the slave controller 29 can direct the current flow "b" by activating the coil R24. Then the window glass (one of 24, 25 and 26) is forced to close as well.

As explained above, the slave controller 29 has the control circuit 10 constructed with a complementary Darlington circuit for driving relays to drive the motor M to operate the regulator and therefore the window glass can be closed or opened. Since the signal to the slave controller 29 is current signal to provide base current for the complementary Darlington circuit, small current is sufficient to operate this system and no surge current or rush current is generated in driving the relays which cause no damage to the electrical contact in the selective switches 11 installed in the master controller MC. Therefore the contact resistance generates fewer problems and the slave controller 29 ensures highly-reliable operation in the power window control system according to the present invention. The small current signal operation maintains high long-term reliability due to a lack of transitional current problems such as surge current.

The control circuit 10 in the slave controller 29 amplifies the current signal given by the switches as an UP switch SW1 and a DOWN switch SW2 installed in the master controller MC and the current signal turns into the rotation of the motors M which operate the regulators 20, 21, 22 for closing and opening the windows. In the aspect of signal allocation for the present power window control system, the switches installed in the master controller MC provide the voltage of the signal wire port as HIGH level/LOW level/CUT OFF which corresponds to the flow-in current/sink current/no flow of current. The allocation of voltages or currents corresponds to the statuses of the regulator as raising/lowering/stopping which finally serve the operation of the window glass as closing/opening/stopping. As the result, the present invention enables the window control by a single wire system through which bidirectional modes of current control and no-current supply (or we can call such an operation of a signal as a combination of dual-mode signals and a null signal) are given to the slave controller 29 in each door.

The allocation of voltages as HIGH level/LOW level/CUT OFF corresponding to the statuses of the regulator as raising/lowering/stopping is especially used when the controller circuit 10 in the slave controller 29 is constructed with power MOS transistors.

As explained above, an advantage of the present invention is that the slave controllers 29 are controlled by the master controller MC by a single wire instead of two wires used for the conventional technology. Due to the reduction of wire harness for such window glass control, the reduction of cable weight is more than the weight of additional slave controllers 29. More advantages are the effectiveness at keeping the cost of assembly down which counterbalances the additional cost of the slave controllers 29, as well as the reduction of wiring assembly failure. Therefore the present invention reduces the costs of car manufacturing more than it sacrifices cost due to the use of slave controllers 29. The high reliability of power window control system of the present invention potentially reduces the unexpected, long-term maintenance cost of the car.

Although the detail technologies and advantages of the present invention have been described and disclosed as well as what are the patent embodiments of the present invention, it will be understood by person skilled in the art that variations and modifications may be made thereto without departing from the scope of the invention, which is indicated by the appended claims.

Other than the selective switches SW1 and SW2 installed in the master controller MC, there are two switched 15 and 16 in each slave controller 29. When UP switch SW1 of the master controller MC is on and DOWN switch 16 is set on which is the reverse status against the UP switch SW1, then a terminal of the motor M is connected to the movable contactor R23 of the relay R2 is cut off from the ground line since the DOWN switch 16 activates the coil R24 to pull the movable contactor R23 of from the contactor R22 which is connected to the ground.

The present invention is applicable to two-door cars as well as the four-door cars which have been described above.

What is claimed is:

1. A power window control system comprising a master control box and a driving mechanism to open and close window glass by means of an electric motor which can be controlled by a master controller installed in said master controller box, wherein said master controller is provided in a driver's seat side and connected to a slave controller which is provided in an other seat side than said driver's seat side and which comprises a control circuit and relay circuitry to electrically switch on and off said motor, and wherein a single wire to which a dual-mode signal and a null signal are applied by said master controller is used for a linkage between said master controller and said slave controller, wherein said linkage works as an electrical wiring such that dual-mode signals and a null signal are applied to said single wire by a selective switching means installed in said master controller, and wherein said selective switching means comprises two serially connected mechanical switches that are inserted between a battery terminal and a ground line and wherein said single wire is electrically connected to a serially connected port disposed between and electrically connected to said two serially connected mechanical switches.

2. The power window control system of claim 1, wherein said driving mechanism operates to open said window glass by a normal rotational direction of said motor and close said window glass by a reverse rotational direction of said motor and neither opens nor closes said window glass while said motor is not rotating.

3. The power window control system of claim 1, wherein said selective switching means comprises a single-channel, two-port switch, wherein the central port of said two-port switch is the serially connected port that is connected with said single wire, and two switching ports are connected to said battery terminal and said ground line.

4. The power window control system of claim 1, wherein said control circuit comprises a two-stage Darlington circuit.

5. The power window control system of claim 1, wherein said dual-mode signals and said null signal generated by said selective switching means such that a driving current defined as one of said dual-mode signals is generated by said selective switching means connected to said battery terminal, wherein a sink current defined as one of said dual-mode signals is generated by said selective switching means connecting to said ground line and wherein, when no current flow, which is defined as a null signal, is set by said selective switching means connecting to neither said battery terminal nor said ground line.

6. The control circuit of claim 5, wherein said driving current activates a half group of transistors partly composing said complementary circuit, wherein said sink current activates the other half group of transistors partly composing said complementary circuit and wherein no flow of current inactivates both said half groups of transistors.

7. A power window control system comprising a master control box and a driving mechanism to open and close window glass by means of an electric motor which can be controlled by a master controller installed in said master controller box, wherein said master controller is provided in a driver's seat side and connected to a slave controller which is provided in an other seat side than said driver's seat side and which comprises a control circuit and relay circuitry to electrically switch on and off said motor, and wherein a single wire to which a dual-mode signal and a null signal are applied by said master controller is used for a linkage between said master controller and said slave controller, and wherein said control circuit is a complementary circuit comprising two power ports connected to said battery and said ground, an input port connected to said single wire, and two drive ports which control said relay circuitry in response to signals applied to said single wire.

8. The power window control system of claim 4, wherein said relay circuitry includes two relays which are connected to said two drive ports.

9. The control circuit of claim 7, wherein said complementary circuit comprises bipolar transistors.

10. The control circuit of claim 7, wherein said complementary circuit comprises power MOS transistors and said dual-mode signals, and said null signal generated by said selective switching means such that a driving voltage defined as one of said dual-mode signals is generated by said selective switching means connecting to said battery terminal, wherein a sink voltage defined as one of said dual-mode signals is generated by said selective switching means connecting to said ground line, and no application of voltage defined as null signal is set by said selective switching means connecting to neither said battery terminal nor said ground line.

* * * * *

UNITED STATES PATENT AND TRADEMARK OFFICE

CERTIFICATE OF CORRECTION

PATENT NO. : 7,145,299 B2
APPLICATION NO. : 10/935436
DATED : December 5, 2006
INVENTOR(S) : Noro et al.

It is certified that error appears in the above-identified patent and that said Letters Patent is hereby corrected as shown below:

Column 8, Line 44, (Claim 8, Line 1), delete “claim 4” and insert --claim 7--.

Signed and Sealed this

Thirtieth Day of January, 2007

JON W. DUDAS
*Director of the United States Patent and Trademark Office*